J. W. JEPSON.
ELECTRICAL SYSTEM OF DISTRIBUTION.
APPLICATION FILED DEC. 21, 1911.
1,134,338.
Patented Apr. 6, 1915.
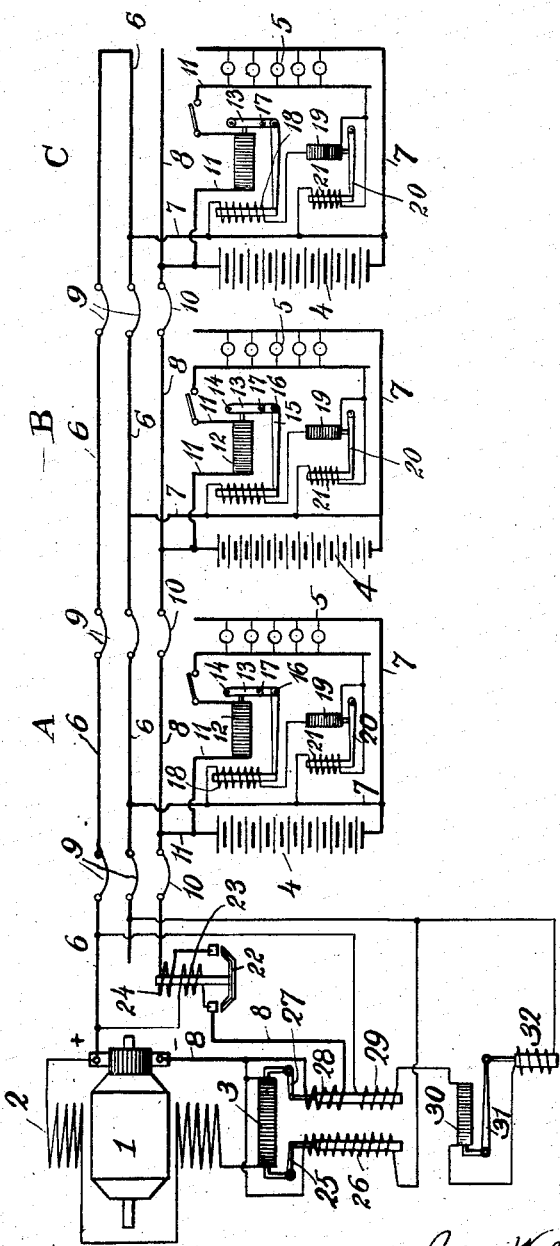

UNITED STATES PATENT OFFICE.

JOHN W. JEPSON, OF DEPEW, NEW YORK, ASSIGNOR TO GOULD COUPLER COMPANY, A CORPORATION OF NEW YORK.

ELECTRICAL SYSTEM OF DISTRIBUTION.

1,134,338.  Specification of Letters Patent.  Patented Apr. 6, 1915.

Application filed December 21, 1911. Serial No. 667,239.

*To all whom it may concern:*

Be it known that I, JOHN W. JEPSON, a citizen of the United States, and a resident of Depew, county of Erie, and State of New York, have invented certain new and useful Improvements in Electrical Systems of Distribution, of which the following is a specification.

My invention relates to improvements in electrical train lighting or similar systems of electrical distribution, and is more especially directed to improvements therein conducive to the more economic and satisfactory operation of such systems.

One object of my invention is to provide such a system, in which a main generator or source is adapted to supply a plurality of train units, each provided with a work circuit and storage battery, so that the generator will charge the storage batteries and supply the work circuits at certain periods, while at other periods the storage batteries may supply the work circuits, and in which suitable apparatus is provided to regulate the generator voltage so that its current output will be properly regulated to accommodate additional train units as they are added, but in which, after a certain number of train units have been added, further increase in the generator output will be prevented in order not to overload the generator.

Further objects, features and advantages will more clearly appear from the detailed description given below, taken in connection with the accompanying drawing, which represents diagrammatically a system embodying my invention in one form.

Referring to the drawing, 1 represents a main generator provided with shunt fields 2—2. In series with the fields 2—2, is a carbon pile 3, forming part of a suitable rheostatic apparatus for regulating the field strength, and consequently the voltage of the generator.

A, B and C represent a plurality of train units, each provided with a battery 4, and work circuit, at 5, although if desired the battery 4 may be omitted from one or more of the train units.

Extending throughout the train is a positive conductor 6 arranged in the form of a loop, as clearly shown in the drawing. The positive sides of each of the batteries 4 are connected to said conductor by means of conductors 7. Also extending throughout the train units from the negative brush of the generator is a train conductor 8. The train conductors 6 and 8 are connected up between the various units by means of connectors 9 and 10, respectively. Each work circuit 5 is connected to the positive side of the positive train conductors 6, by means of conductors 7, while the negative side is connected to the negative conductor 8 by means of conductors 11. The negative side of each battery is also connected to the negative conductor 8 by means of conductors 11.

In series with each work circuit on the negative side thereof, is a carbon pile rheostat 12, operated upon by a lever 13, pivoted at 14. Operating upon the lower end of the lever 13 is a bell crank lever 15, pivoted at 16, the short arm of the bell crank lever 15 being pivoted to the lever 13, at 17.

Operating upon the long arm of the lever 15 is a solenoid 18, connected across the work circuit 5, to be responsive to voltage variations thereof. In series with the solenoid 18 is a carbon pile 19 operated upon by a lever 20, controlled by a solenoid 21, also connected across the work circuit 5, to be responsive to voltage variations thereof.

In series in the negative train conductor 8 is a main switch 22, controlled by a voltage coil 23, connected across the train conductors 6 and 8. A coil 24 coöperates with the coil 23 in controlling the action of the switch 22, the coil 24 being in series in the train conductor 8, and on normal operation being wound to aid the coil 23.

Operating upon one end of the carbon pile 3 is a bell crank lever 25, controlled by a solenoid 26, the coil of which solenoid is connected across the mains, one terminal being connected to the negative brush of the generator, and the other to the end of the positive loop conductor. Operating upon the other end of the carbon pile 3 is a bell crank lever 27 controlled by two solenoid coils 28 and 29. The coil 28 is in series in the negative conductor 8, while the coil 29 is connected across the terminals of the loop conductor 6, in order to be responsive to variations of the line drop in said conductor. In series with the coil 29 is a carbon pile rheostat 30, operated by a bell crank lever 31, which is controlled by a coil 32 also in series with the coil 29.

The normal operation of the system is as follows: Assuming the generator to be driven at a variable speed by the movement of the train, but at a speed so low that it will not produce a sufficient voltage to charge the batteries or properly supply the work circuits 5, under these conditions the main switch 22 will be opened so that the batteries 4 will supply the work circuits 5, in a well known manner. Any variations in the voltage of the battery or across the train conductors, is substantially prevented from taking place across the work circuits by the operation of the rheostats 12, in series with the work circuits 5. Should any change in voltage tend to take place across the work circuits 5, this change reacts through coils 21, to operate the carbon piles 9, which magnify the change in current in the solenoids 18, thereby causing sufficient operation of the rheostats 12 to maintain the voltage across the work circuits 5 substantially constant, in a now well known manner. When the speed of the generator 1 becomes sufficient, so that it will produce a voltage sufficient to charge the batteries 4, or feed the work circuits 5, then the strength of the coil 23 is sufficient to close the switch 22, thereby connecting the generator to the train line and the various batteries and work circuits. Upon the closing of the switch 22 the series coil 24 becomes energized, and aids the coil 23. In case the generator speed should drop so that the voltage would drop below that of the batteries 4, thereby allowing the batteries to feed the current back to the generator, then the polarity of coil 24 would be reversed so as to oppose the action of coil 23, and cause the switch 22 to immediately open, in a well known manner. Assuming now that the generator voltage is sufficient to supply the work circuits and batteries, and the main switch 22 is closed, and the batteries are being charged by current from the generator 1, then the generator voltage is regulated by the action of the coil 28 upon the carbon pile 3, so as to maintain a substantially constant current output, by the generator. If, as by increase in generator voltage, the current output of the generator tends to increase above a predetermined value, the coil 28 becomes sufficiently energized to raise its core and operate the lever 27 to increase the resistance of the rheostat 3, thereby limiting the generator voltage in a well known manner. During this stage of the operation the strength of coil 29 remains substantially constant so that it does not materially alter the operation of the coil 28. When, however, the batteries have become substantially charged, and their voltage accordingly increased to a predetermined value, then the voltage applied to, and the strength of the coil 26, becomes sufficient to raise its core, causing operation of the lever 25, whereby it will insert resistance in the rheostat 3, and substantially prevent the generator voltage from going higher, in a well known manner. The generator voltage being thus limited, the current going to the batteries soon decreases to some extent, thereby decreasing the strength of the coil 28, whereupon its core immediately drops back to its inoperative position, so that the generator is now regulated wholly by the voltage coil 26, to maintain the voltage across the train line substantially constant. As above explained, this increase in voltage across the train lines, due to the charging of the batteries, is prevented from falling upon the work circuits 5, by the operation of the lamp regulators 12.

Assuming that the generator 1 is charging the various batteries and supplying the work circuits, as above explained, and during this operation, one or more other train units are added to the system, it is then important that the current output of the generator be increased in order to properly supply current to these additional units for the purpose of charging the batteries and feeding the work circuits. In order to accomplish this the coil 29 is provided, which is responsive to voltage changes in the drop in the train line 6. Thus as more train units are added the train line 6 becomes just so much longer, and consequently the voltage drop across the terminals of the coil 29 becomes just so much greater, so that its strength is increased more or less, in proportion to the addition of train units. The coil 29 opposes the coil 28, so that with such an increase in the strength of the coil 29, it requires increase in the current in the coil 28, in order to raise the core thereof to operate the rheostat 3 to regulate the generator 1, so that the increase in strength of the coil 29 causes a corresponding increase in the current output of the generator 1, to accommodate the additional train units, as will be clearly understood by those skilled in the art. It is however, desirable that after a certain number of train units have been added, the current output of the generator be limited, as otherwise, if a large number of train units were added the capacity of the generator might be exceeded, and the generator be overloaded to such an extent as to injure the same, or do other damage. In order to bring about this result I therefore provide rheostat 30, in series with the coil 29, which rheostat is operated by the coil 32 in series with the coil 29. After a predetermined number of train units have been added to the system, which is measured by a predetermined voltage at the terminals of the train conductor 6, the current through the coil 32 becomes sufficient to raise its core and operate the rheostat 30, so as to insert resistance in series with the coil 29, and thereby prevent the current therein from going materially higher, and maintaining the same substantially constant. It will therefore be clear that after a predetermined number of train units have been added and the current in the coils 32 and 29 has reached a predetermined value, this current will be limited, and maintained substantially constant so as to maintain the effect of the coil 29 substantially constant, by the action of the rheostat 30. It will therefore be clear that the main generator is so regulated that the main generator voltage is regulated responsive to departures from predetermined electrical conditions of the system, in order that it may supply current proper to accommodate the needs of the various train units, and means for changing said predetermined condition in order to increase the generator voltage as more train units or translating devices are added, and means for limiting the change produced thereby when a predetermined number of train units have been added, in order to prevent the main generator from becoming overloaded.

Although I have described my improvements in great detail and with respect to one particular form thereof, nevertheless I do not desire to be limited to such details except as clearly specified in the appended claims, since many changes and modifications may well be made without departing from the spirit and scope of my invention in its broadest aspects.

However, having fully and clearly described my improvements in one form, what I claim as new and desire to secure by Letters Patent, is:

1. In an electrical train lighting system, a main generator, a plurality of train units, a work circuit on each unit, arranged to be fed by said generator, means for regulating the generator voltage to maintain a substantially constant current output, means for increasing said substantially constant current output as more train units are added to the system, and means for limiting the increase produced by said last mentioned means when a predetermined number of train units have been added.

2. In an electrical system of distribution, a main generator, translating devices arranged to be fed thereby, means for regulating the generator voltage responsive to departures from a predetermined electrical condition of the system, means for changing said condition to increase the generator voltage as more translating devices are connected and fed by the generator, and means for limiting the change produced by said changing means when a predetermined number of translating devices have been connected and energized by the generator.

3. In an electrical train lighting system, a plurality of train units, a work circuit on each unit, a main generator for feeding said work circuits, a rheostat for regulating the generator voltage, a coil for regulating said rheostat responsive to changes in the current output of the generator to maintain a substantially constant current output, a coil coöperating with said first mentioned coil for causing said substantially constant current to be increased when additional work circuits are connected to the generator, and means for limiting such increase of said substantially constant current when a predetermined number of work circuits have been connected.

4. In an electrical system of distribution having a main source of electrical energy, a plurality of work circuits, and storage batteries connected to be fed thereby, means for causing the source to supply a substantially constant output to the work circuits and batteries, means for causing said output to increase as more work circuits and batteries are connected to be fed by the source and means for causing the output to be limited when a predetermined number of work circuits and batteries have been connected to be fed by the source.

5. In an electrical train lighting system, a main generator, a plurality of train units, a work circuit and battery on each unit connected to be fed by the generator, a rheostat for regulating the generator, electromagnetic means for regulating said rheostat, comprising a coil responsive to current variations of the system tending to maintain a substantially constant output by the generator, a coil responsive to changes in the voltage drop of the line of the system for causing the generator output to increase as additional train units are connected to be fed by the generator, and means for limiting the action of said last mentioned coil when the line drop has reached a predetermined value.

6. In an electrical train lighting system, a main generator, a plurality of train units, a work circuit and battery on each unit connected to be fed by the generator, a rheostat for regulating the generator, electromagnetic means for regulating said rheostat, comprising a coil responsive to current variations of the system tending to maintain a substantially constant output by the generator, a coil responsive to changes in the voltage drop of the line of the system for causing the generator output to increase as additional train units are connected to be fed by the generator, and means for limiting the action of said last mentioned coil when the line drop has reached a predetermined value, said last mentioned means embracing a rheostat in series with said last mentioned coil and a coil in series with said last mentioned coil for controlling said last mentioned rheostat.

7. In an electrical train lighting system, a plurality of train units, a work circuit on each unit, a main generator for feeding said work circuits, a rheostat for regulating the generator voltage, a coil for regulating said rheostat responsive to changes in the current output of the generator to maintain a substantially constant current output, a coil coöperating with said first mentioned coil for causing said substantially constant current to be increased when additional work circuits are connected to the generator, and means for limiting such increase of said substantially constant current when a predetermined number of work circuits have been connected, said last mentioned means embracing a rheostat in series with said last mentioned coil, and a coil in series with said last mentioned coil for regulating the operation of said last mentioned rheostat.

8. In an electrical system of distribution, a source of electrical energy, a plurality of work circuits connected to be fed by said source, rheostatic apparatus controlling the voltage of the source, for causing the current output of the source to increase as more work circuits are connected to be fed thereby, and means responsive to changes in the electrical condition of the system for causing said current output to be limited, to prevent the source from becoming overloaded.

9. In an electrical train lighting system, a plurality of train units, a work circuit on each unit, a main generator for feeding said work circuits, a rheostat for regulating the generator voltage, a coil for regulating said rheostat responsive to changes in the current output of the generator to maintain a substantially constant current output, a coil coöperating with said first mentioned coil for causing said substantially constant current to be increased when additional work circuits are connected to the generator, and means for limiting such increase of said substantially constant current when a predetermined number of work circuits have been connected, said second mentioned coil being responsive to changes in the line drop of the system, and said last mentioned means embracing a rheostat for maintaining the current in said second mentioned coil substantially constant after the current therein has reached a predetermined value.

10. In an electrical system of distribution, a source of electrical energy, a plurality of work circuits connected to be fed by said source, rheostatic apparatus controlling the voltage of the source, for causing the current output of the source to increase as more work circuits are connected to be fed thereby, and means responsive to changes in the electrical condition of the system, for causing said current output to be limited, to prevent the source from becoming overloaded, said rheostatic apparatus embracing a regulating coil responsive to changes in the line drop of the system and said last mentioned means embracing a rheostat for maintaining the current in said coil substantially constant after it has reached a predetermined value.

11. In an electrical train lighting system, a main generator, a plurality of train units, a work circuit and storage battery on each unit, train conductors extending from the generator to the work circuits and batteries to connect the latter to the generator to be fed by the generator, one of said conductors being a loop conductor, and rheostatic controlling apparatus for regulating the voltage of the generator, said apparatus embracing a coil for causing the current output of the generator to increase as more train units are connected to be fed by the generator, said coil being connected across the terminals of said loop conductor, and rheostatic apparatus for maintaining the current in said coil substantially constant after it has reached a predetermined value.

12. In an electrical train lighting system, a main generator, a plurality of train units, a work circuit on each unit, arranged to be fed by said generator, means for regulating the generator voltage to maintain a substantially constant current output, means for increasing said substantially constant current output as more train units are added to the system, means for causing the voltage of the generator to be limited when it has been increased to a predetermined value, and means for limiting the increase produced by said last mentioned means when a predetermined number of train units have been added.

13. In an electrical train lighting system, or the like, a variable speed generator driven by the movement of the train, a plurality of train units each carrying a battery and work circuit arranged to be fed by the generator, means for regulating the field strength of the generator to regulate its voltage, a coil for regulating the action of said means to increase the voltage of the generator when more train units are connected to be supplied by the generator, said coil being responsive to variations in the line drop to said work circuits, and means for limiting the increasing effect of said coil when a predetermined number of train units have been added to be fed by the generator.

14. In an electrical train lighting system, a plurality of train units, a work circuit on each unit, a main generator for feeding said work circuits, a rheostat for regulating the generator voltage, a coil for regulating said rheostat to limit the voltage of the generator to a predetermined value, a coil for regulating said rheostat responsive to changes in the current output of the generator to maintain a substantially constant current output, a coil coöperating with said second mentioned coil for causing said substantially constant current to be increased when additional work circuits are connected to the generator, and means for limiting such increase of said substantially constant current when a predetermined number of work circuits have been connected, said last mentioned means embracing a rheostatic apparatus for maintaining the current in said third coil substantially constant when it has reached a predetermined value.

15. In an electrical train lighting system, a variable voltage generator, a plurality of train units each carrying a battery and work circuit arranged to be fed by the generator, a loop conductor extending from the generator to the various work circuits and batteries, means for regulating the field strength of the generator to regulate its voltage, a coil for regulating the action of said means to increase the voltage of the generator when more train units are connected to be fed by the generator, said coil being responsive to variations in the voltage drop in said loop conductor, a rheostat for regulating the current in said coil, and a coil for controlling said rheostat to maintain the action of said first mentioned coil substantially constant when the current therein has reached a predetermined value.

16. In an electrical train lighting system, a variable voltage generator, a plurality of train units each carrying a battery and work circuit arranged to be fed by the generator, a loop conductor extending from the generator to the various work circuits and batteries, means for regulating the field strength of the generator to regulate its voltage, a coil responsive to voltage variations of the system for regulating the action of said means to limit the voltage of the generator to a predetermined value, a coil for regulating the action of said means to maintain a substantially constant current output by the generator, a coil responsive to variations in the voltage drop of said loop conductor for regulating the action of said means to cause said substantially constant current output to increase as more work circuits are added, a rheostat for regulating the current in said last mentioned coil, and a coil in series with said last mentioned coil and controlling said rheostat to maintain a substantially constant current in said last mentioned coil when the current therein has reached a predetermined value.

In testimony whereof, I have signed my name to this specification, in the presence of two subscribing witnesses.

JOHN W. JEPSON.

Witnesses:
J. L. WALKER,
P. W. ENGLISH.